US008686830B2

(12) United States Patent
Lehomme

(10) Patent No.: US 8,686,830 B2
(45) Date of Patent: Apr. 1, 2014

(54) COMMUNICATION SYSTEM INCLUDING A VEHICLE ELECTRONIC KEY, ELECTRONIC KEY FOR USE IN A COMMUNICATION SYSTEM AND METHOD FOR COMMUNICATING INFORMATION FROM A VEHICLE TO A PORTABLE TELECOMMUNICATION TERMINAL

(75) Inventor: Francis Lehomme, Avernes (FR)

(73) Assignee: Johnson Controls Technology Company, Holland, MI (US)

( * ) Notice: Subject to any disclaimer, the term of this patent is extended or adjusted under 35 U.S.C. 154(b) by 519 days.

(21) Appl. No.: 12/532,239

(22) PCT Filed: Mar. 18, 2008

(86) PCT No.: PCT/EP2008/002155

§ 371 (c)(1),
(2), (4) Date: Dec. 10, 2009

(87) PCT Pub. No.: WO2008/125177

PCT Pub. Date: Oct. 23, 2008

(65) Prior Publication Data

US 2010/0090799 A1 Apr. 15, 2010

(30) Foreign Application Priority Data

Mar. 21, 2007 (DE) ......................... 10 2007 014 066

(51) Int. Cl.
*G05B 19/00* (2006.01)

(52) U.S. Cl.
USPC ................. 340/5.61; 340/426.36; 340/426.13

(58) Field of Classification Search
None
See application file for complete search history.

(56) References Cited

U.S. PATENT DOCUMENTS 5,305,435 A 4/1994 Bronson
5,704,051 A 12/1997 Lane et al.

(Continued)

FOREIGN PATENT DOCUMENTS

DE 101 42 967 A1 3/2003
DE 10142967 A1 3/2003

(Continued)

OTHER PUBLICATIONS

International Search Report, Application No. PCT/EP2008/002155, dated Oct. 22, 2008, published as WO2008/125177.

(Continued)

*Primary Examiner* — Mohammad Ghayour
*Assistant Examiner* — Brian Wilson
(74) *Attorney, Agent, or Firm* — The Dobrusin Law Firm, PC

(57) ABSTRACT

The invention relates to a communication system that comprises a vehicle electronic key, a vehicle telecommunication device and a portable telecommunication terminal, the electronic key including a first transmitter and the vehicle including a first receiver, the first transmitter and the first receiver being provided for carrying out the transmission of at least one information request from the electronic key to the vehicle, the vehicle telecommunication device including at least a second transmitter, the portable telecommunication terminal including at least a second receiver, the second transmitter and the second receiver being provided for carrying out the transmission of information from the vehicle to the portable telecommunication terminal, the portable telecommunication terminal being provided for displaying at least a portion of the information on a display member of the portable telecommunication terminal. The invention also relates to an electronic key and to a method for communicating information from a vehicle to a portable telecommunication terminal.

12 Claims, 1 Drawing Sheet

(56) References Cited

U.S. PATENT DOCUMENTS

| | | | | |
|---|---|---|---|---|
| 6,429,773 | B1 * | 8/2002 | Schuyler | 340/425.5 |
| 6,825,758 | B1 * | 11/2004 | Laitsaari | 340/442 |
| 6,885,285 | B2 * | 4/2005 | Losey | 340/5.72 |
| 7,064,657 | B2 * | 6/2006 | Becker et al. | 340/426.1 |
| 7,128,274 | B2 | 10/2006 | Kelley et al. | |
| 7,423,529 | B2 * | 9/2008 | Singer et al. | 340/540 |
| 7,504,931 | B2 * | 3/2009 | Nguyen | 340/426.36 |
| 7,548,491 | B2 * | 6/2009 | Macfarlane | 367/198 |
| 7,821,383 | B2 * | 10/2010 | Sultan et al. | 340/426.13 |
| 2002/0030592 | A1 * | 3/2002 | Hakanen et al. | 340/442 |
| 2003/0041329 | A1 * | 2/2003 | Bassett | 725/105 |
| 2003/0043021 | A1 | 3/2003 | Chung | |
| 2004/0046751 | A1 | 3/2004 | Heimermann et al. | |
| 2004/0066452 | A1 * | 4/2004 | Gauthier | 348/148 |
| 2006/0293802 | A1 * | 12/2006 | Kitao et al. | 701/2 |
| 2007/0279304 | A1 | 12/2007 | Chakam et al. | |
| 2008/0055058 | A1 | 3/2008 | Nishiyama | |
| 2009/0289109 | A1 | 11/2009 | Sims et al. | |

FOREIGN PATENT DOCUMENTS

| | | | |
|---|---|---|---|
| DE | 102 05 642 | A1 | 8/2003 |
| EP | 0 320 439 | A2 | 6/1989 |
| EP | 0320439 | A | 6/1989 |
| EP | 0 955 219 | A2 | 11/1999 |
| EP | 1 319 563 | A1 | 6/2003 |
| EP | 1319563 | A | 6/2003 |
| EP | 1 361 324 | A2 | 11/2003 |
| EP | 1361324 | A | 11/2003 |
| GB | 2 240 418 | A | 7/1991 |
| GB | 2240418 | A | 7/1991 |
| JP | 2005/011107 | A | 1/2005 |
| WO | 2008/0134657 | A2 | 11/2008 |

OTHER PUBLICATIONS

International Search Report, Application No, PCT/EP2008/002155, dated Oct. 22, 2008, published as WO2008/125177.

* cited by examiner

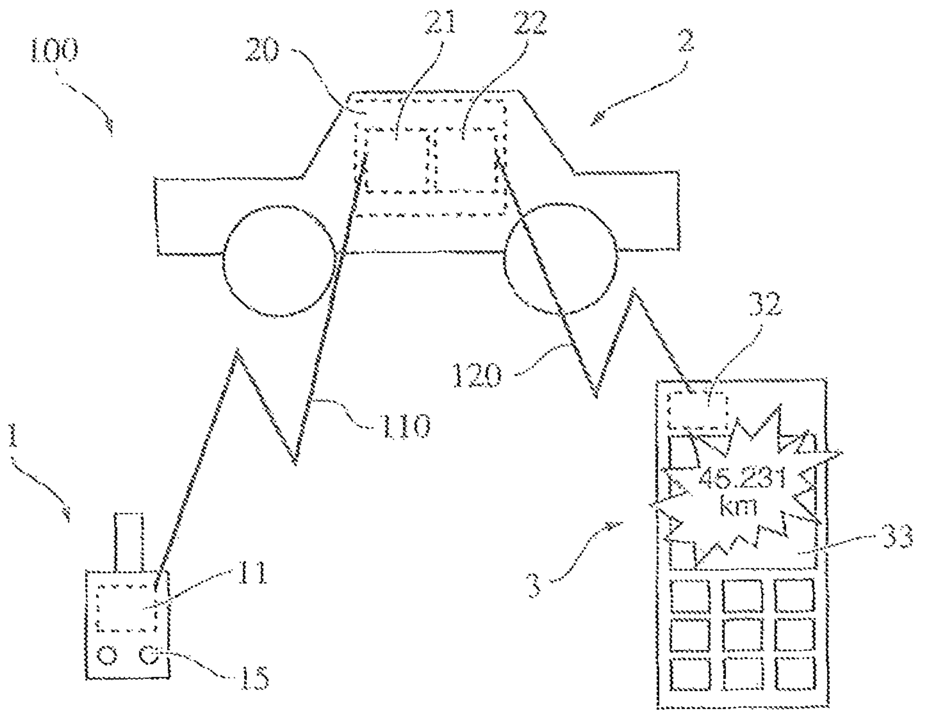
100
20
21
22
2
32
120
110
1
45.231
km
33
3
11
15

COMMUNICATION SYSTEM INCLUDING A VEHICLE ELECTRONIC KEY, ELECTRONIC KEY FOR USE IN A COMMUNICATION SYSTEM AND METHOD FOR COMMUNICATING INFORMATION FROM A VEHICLE TO A PORTABLE TELECOMMUNICATION TERMINAL

CLAIM OF BENEFIT OF FILING DATE

The present application claims the benefit of the filing date of PCT Application Ser. No. PCT/EP2008/002155 (filed Mar. 18, 2008) (Published as WO 2008/125177) and DE 10 2007 014 066.7(filed Mar. 21, 2007), the contents of which are hereby incorporated by reference in their entirety.

The present invention relates to a communication system comprising an electronic key of a vehicle, and a telecommunication device of the vehicle. The present invention also relates to an electronic key for use in a telecommunication system and a method for communicating information from a vehicle to a portable telecommunication terminal.

Communication systems comprising an electronic key of a vehicle and a telecommunication device of the vehicle are known, for example from the German patent application DE 101 42 967 A1. This publication proposes providing a vehicle with a vehicle telecommunication device capable of communicating with a vehicle key in the form of a PDA (Personal Digital Assistant). With this electronic key in the form of a personal digital assistant, it is possible to control and actuate many of the vehicle functions. The personal digital assistant includes a display element so that it is possible to represent, on the display element, for example an image representing a function likely to be activated in the vehicle.

One drawback to such a system or such a vehicle, according to the prior art, consists in the need to provide a relatively complex device for performing such an electronic key function with a display element. Such an electronic key requires, for example, not only a transmitter but also a radio communication receiver and a display element which makes the production of such a device or of such an electronic key relatively costly and bulky, and increases the weight of such an electronic key. Another drawback to a device according to the prior art lies in the sensitivity or susceptibility of such a device in daily and long-term use, for example over several years.

The main aim of the present invention is to overcome the drawbacks of the prior art, and in particular those cited hereinabove, and also to propose a communication system, an electronic key and a method for communicating information from a vehicle to a portable communication terminal which makes it possible to produce an inexpensive, very small and robust electronic key, and at the same time makes it possible to provide the user of such a system with the possibility of displaying complex information on the display element which said user normally has available independently of the use of his vehicle.

According to the invention, this aim is achieved by a communication system comprising an electronic key of a vehicle, a telecommunication device of the vehicle and a portable communication terminal, the electronic key including a first transmitter and the vehicle including a first receiver, the first transmitter and the first receiver being provided for performing a wireless transmission of at least one information request from the electronic key to the vehicle, the telecommunication device of the vehicle including at least one second transmitter, the portable telecommunication terminal including at least one second receiver, the second transmitter and the second receiver being provided for performing a wireless transmission of information from the vehicle to the portable communication terminal, the portable communication terminal being provided for displaying at least a portion of the information on the display element of the portable communication terminal. With such a communication system, it is advantageously possible to obtain the electronic key in a manner that is very inexpensive and with the smallest possible bulk. In addition, there is no need to provide sophisticated programming suited to the user of the electronic key. Another important benefit of a communication system according to the invention consists in providing a wireless communication between the electronic key and the vehicle and between the vehicle and the portable telecommunication terminal in an extremely safe and secure way without such a high security level requiring additional and costly measures. In particular, the security level of the radio communication transmissions between the elements of the communication system is of the same level as the security level of a vehicle electronic key that is commonly used and increasingly commonplace.

According to a preferred embodiment, the first transmitter and the first receiver are provided for a short-range wireless communication, notably for a range less than 500 meters, preferably for a range-less than 150 meters, and particularly for a range-less than 50 meters. Such a choice of range for the communication between the first transmitter and the first receiver simplifies not only the communication between the electronic key and the vehicle but also increases the level of security for the communication between the electronic key and the vehicle. Also, by a short-range wireless communication, it is possible to use comparatively weak transmission powers of the first receiver, so that the life of such an electronic key can be increased or the recharging intervals of such an electronic key can be extended.

A preferred refinement of the invention lies in the fact that the second transmitter and the second receiver are provided for a short-range wireless communication, notably for a range-less than 500 meters, preferably for a range-less than 150 meters, and particularly for a range-less than 50 meters, notably a communication according to a WLAN (Wireless Local Area Network) and/or WIGWAM (Wireless Gigabit With Advanced Multimedia support) and/or Bluetooth standard.

According to another preferred embodiment, the second transmitter and the second receiver are provided for a communication in a cellular radio communication network, notably of GSM the (Global System for Mobile communications) type and/or of the UMTS (Universal Mobile Telecommunications System) type. The benefit of using the second transmitter and the second receiver in this way lies in the fact that it is possible to use a portable telecommunication terminal which does not require adaptation to the communication system according to the invention, meaning that it is possible to use any portable telecommunication terminal or even a non-portable telecommunication terminal which complies with a communication standard in a cellular radio communication network. Furthermore, it is thus possible to transmit information concerning the vehicle over long distances, notably greater than a few hundreds of meters or a few kilometers so as to be able to transmit the information from the telecommunication device of the vehicle to the portable or non-portable telecommunication terminal.

A preferred refinement of the invention also lies in the fact that the information is provided as security information, notably concerning the interior and/or the exterior of the vehicle and/or as technical information and/or as comfort information. With such an embodiment of the communication system, it is advantageously possible to transmit, between the telecommunication device of the vehicle on the one hand and the portable telecommunication terminal on the other hand, the information which may be either highly targeted on a need to transmit specific information (for example, the transmission of information if there is an individual present inside and/or outside close to the vehicle, for example a thief) and it is also possible to transmit a choice or a sequence of relatively complex and exhaustive information so as to be able to display on the display element of the portable telecommunication terminal all the information that a user wants to receive concerning the vehicle, for example security information relating to the interior and/or the exterior of the vehicle, technical information concerning, for example, the mileage of the vehicle, error messages from diagnostic units of the vehicle or even comfort information, for example concerning the temperature inside the vehicle and/or the temperature of the seats and/or of the steering wheel of the vehicle.

According to another preferred embodiment, the electronic key includes an actuating element for the transmission of the information request from the electronic key to the vehicle. With such an embodiment of the electronic key, it is advantageously possible to provide a simple and intuitive way of using the communication system according to the present invention because a user is not forced to make a choice from a multitude of keys or buttons or other settable elements to control the transmission of the information request from the electronic key to the vehicle. Furthermore, a smaller number of actuating elements on the electronic key considerably reduces the cost price of such a key and its size.

Another preferred refinement of the invention lies in the fact that the telecommunication device of the vehicle and/or the portable telecommunication terminal includes at least one selection means for determining the information received and displayed by the portable telecommunication terminal and/or for determining the order of display of the information by the portable telecommunication terminal. With such a selection means, it is advantageously possible to provide a selection of the information to be transmitted from the vehicle to the portable telecommunication terminal or of the information to be displayed preferably or beforehand on the display element of the portable telecommunication terminal. It is thus possible to make a choice of the information to be transmitted prior to the transmission of the information or it is possible to make this choice after the transmission of the information or of a large quantity of information so that the choice or the selection from a large quantity of information received on the portable telecommunication terminal is made from a display selection or a selection of the order of display.

The present invention also relates to an electronic key for use in a communication system according to the present invention and an electronic key which includes an actuating element for the transmission of the information request from the electronic key to the vehicle. It is thus advantageously possible to produce a communication system according to the invention without providing an excessively complex or costly electronic key.

Moreover, the present invention also relates to a method for communicating information from a vehicle to a portable telecommunication terminal by using a communication system according to the present invention in which in a first step, the information request is transmitted from the electronic key to the telecommunication device of the vehicle via the first transmitter and the first receiver, in a second step, the information is transmitted from the telecommunication device of the vehicle to the portable telecommunication terminal via the second transmitter and the second receiver, in a third step, the information is displayed by the display element of the portable telecommunication terminal.

With such a method, it is advantageously possible to use an electronic key of reduced complexity and size while using the portable telecommunication terminal with its display element for the purposes of displaying the transmitted information.

In such a telecommunication method, it is preferable according to the present invention that, in a fourth step which is situated in time before the first step, a selection for determining the information to be transmitted to the portable telecommunication terminal is made on the telecommunication device of the vehicle and/or a determination of the order of display of the information by the portable telecommunication terminal is made on the telecommunication device of the vehicle and/or on the portable telecommunication terminal. It is thus possible to guide and select the transmitted information and the display of this information on the portable telecommunication terminal.

Other features and benefits of the invention will become apparent from reading the following description of a particular, nonlimiting embodiment of the present invention.

BRIEF DESCRIPTION OF THE DRAWINGS

The invention will be better understood from the following description, which relates to preferred embodiments, given by way of nonlimiting example and explained with reference to the appended schematic drawings, in which:

FIG. 1 is a schematic view of the elements of a communication system according to the present invention.

DESCRIPTION OF THE DRAWINGS

As FIG. 1 of the appended drawing shows, the communication system 100 comprises an electronic key 1 of a vehicle 2. The vehicle 2 includes a telecommunication device 20 of the vehicle 2. The communication system 100 also comprises a portable telecommunication terminal 3. The electronic key 1 includes a first transmitter 11. The telecommunication device 20 of the vehicle includes a first receiver 21 and a second transmitter 22. The portable telecommunication terminal 3 includes a second receiver 32. The first transmitter 11 and the first receiver 21 are provided for performing a wireless transmission of at least one information request 110 from the electronic key 1 to the vehicle 2. The second transmitter 22 and the second receiver 32 are provided for performing a wireless transmission of information 120 from the vehicle 2 to the portable telecommunication terminal 3. The portable telecommunication terminal 3 also includes a display element 33. The display element 33 is provided for displaying at least a portion of the information 120 transmitted between the vehicle 2 and the portable telecommunication terminal 3. The electronic key 1 also includes an actuating element 15, for example a key, a button or another actuating element. By actuating the actuating element 15, a user can provoke the transmission of the information request 110 from the electronic key 1 to the vehicle 2. The information request 110 is processed in the vehicle 2, notably in the telecommunication device 20 of the vehicle 2. After processing, the second transmitter 22 transmits the information 120 to the second receiver 32 of the portable telecommunication terminal for display on the display element 33.

In the context of the present invention, provision is made for the information request 110 and the information 120 to be transmitted in a secure manner. This can be achieved by securing at least one of the two transmission channels, that is to say either between the electronic key 1 and the vehicle 2, or between the vehicle 2 and the portable telecommunication terminal 3. The other of the two transmission channels is therefore also secured.

According to the present invention, the transmission of the information request 110 and the transmission of the information 120 is secured in a preferred manner by securing the transmission of the information request 110 between the electronic key 1 and the vehicle 2. This can be achieved by using a transmission or a communication protocol of the type used between an electronic key and a car to open or close the central car locking, for example a microwave transmission in one or more ISM (industrial, scientific and medical) bands. Such a transmission is normally provided in the most secure possible way.

The information 120 can be provided as security information. For example, such security information may comprise an image or a sequence of images of the surroundings of the vehicle 2 so that it is possible for a user approaching the vehicle 2 to see that there is no one in the vicinity of the vehicle 2. Moreover, such security information may include information concerning the presence or absence of a person (not presumed) in the vehicle 2 so that it is possible for a user approaching the vehicle 2 to see that there is no one in the vehicle 2.

The information 120 can also (as an addition or an alternative to security information) be provided as technical information and/or comfort information. For example, such technical information may comprise information on the mileage of the vehicle (for example when the user is visiting a garage or in a vehicle rental station) and/or concerning error messages (for example, from one or more diagnostic units of the vehicle) so that it is possible to provide information on one or more technical parameters of the vehicle. For example, such comfort information may comprise information on the temperature inside the vehicle and/or on the temperature of one or more seats and/or of the steering wheel of the vehicle so that it is possible to provide information on one or more comfort parameters of the vehicle.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The term "consisting essentially of" (or a derivation thereof) to describe a combination shall include the elements, components or steps identified, and such other elements, components or steps that do not materially affect the basic and novel characteristics of the combination. The use of the terms "comprising" or "including" (or derivations thereof) to describe combinations of elements, components or steps herein also contemplates embodiments that consist essentially of (or even consist of) the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The teachings herein also contemplate methods of using the structures as described, as well as methods that include operational steps performed by the structures herein. Though the use of a single element, component or step is contemplated by the teachings, the disclosure of "a" or "one" to describe an element, component or step is not intended to foreclose additional elements, ingredients, components or steps.

List Of References

1 Electronic key
2 Vehicle
3 Portable telecommunication terminal
11 First transmitter
15 Actuating element
20 Telecommunication device of the vehicle
21 First receiver
22 Second transmitter
32 Second receiver
33 Display element
100 Communication system
110 Information request
120 Information

The invention claimed is:

1. A communication system comprising:

an electronic key of a vehicle including a first transmitter and an actuating element for transmitting at least one information request;

a telecommunication device of the vehicle including a first receiver configured to receive the at least one information request and at least one second transmitter configured to transmit information to a portable telecommunication terminal;

the portable telecommunication terminal including at least one second receiver configured to receive the information transmitted from the at least one second transmitter and a display configured to display the received information;

the first transmitter, the first receiver, the at least one second transmitter and the at least one second receiver are each configured for short-range wireless communication in a range less than 500 meters; and the telecommunication device and the portable telecommunication terminal include a selection means for a user to determine the information received and displayed by the portable telecommunication terminal and for determining an order the received information is displayed by the portable telecommunication terminal, wherein the user can select between security information, technical information, and comfort information, wherein the security information comprises information concerning an interior and an exterior of the vehicle.

2. The communication system as claimed in claim 1, wherein the short-range wireless communication uses a WLAN (Wireless Local Area Network) and WIGWAM (Wireless Gigabit With Advanced Multimedia Support) and Bluetooth standard.

3. The communication system as claimed in claim 1, wherein the comfort information comprises information concerning a temperature inside the vehicle and a temperature of the seats and a temperature of the steering wheel of the vehicle and wherein the technical information comprises information concerning a mileage of the vehicle and/or error messages from diagnostic units of the vehicle.

4. An electronic key for use in the communication system as claimed in claim 1.

5. The electronic key as aimed in claim 4, wherein the actuating element is a key.

6. A method for communicating information from a vehicle to a portable telecommunication terminal by using the communication system as claimed in claim 1, wherein in a firsts step, the information request is transmitted form the electronic key to the telecommunication device of the vehicle via the first transmitter and the first receiver, in a second step, the information is transmitted from the telecommunication device of the vehicle to the portable telecommunication terminal via the at least one second transmitter and the at least one second receiver, in a third step, the received information is displayed by the portable telecommunication terminal, in a fourth step which is situated in time before the first step, a selection for determining the information to be transmitted to the portable telecommunication terminal is made on the telecommunication device of the vehicle or the portable telecommunication terminal, and/or a determination of an order the received information is displayed by the portable telecommunication terminal is made on the telecommunication device of the vehicle or on the portable telecommunication terminal.

7. The method for communicating information as claimed in claim 6, wherein the information comprises comfort information concerning a temperature inside the vehicle and a temperature of the seats and a temperature of the steering wheel of the vehicle and the technical information comprises information concerning a mileage of the vehicle and error messages from diagnostic units of the vehicle.

8. The communication system as claimed in claim 1, wherein the first transmitter and the first receiver are configured to communicate in a range less than 150 meters.

9. The communication system as claimed in claim 8, wherein the first transmitter and the first receiver are configured to communicate in a range less than 50 meters.

10. The communication system as claimed in claim 1, wherein the at least one second transmitter and the at least one second receiver are configured to communicate in a range less than 150 meters.

11. The communication system as claimed in claim 10, wherein the at least one second transmitter and the at least one second receiver are configured to communicate in a range less than 50 meters.

12. A communication system comprising:

an electronic key of a vehicle including a first transmitter and an actuating element for transmitting at least one information request;

a telecommunication device of the vehicle including a first receiver configured to receive the at least one information request and at least one second transmitter configured to transmit information to a portable telecommunication terminal;

the portable telecommunication terminal including at least one second receiver configured to receive the information transmitted from the at least one second transmitter and a display configured to display the received information;

the first transmitter, the first receiver, the at least one second transmitter and the at least one second receiver are each configured for short-range wireless communication in a range less than 500 meters; and the telecommunication device and the portable telecommunication terminal include a selection means for a user to determine the information received and displayed by the portable telecommunication terminal and for determining an order the received information is displayed by the portable telecommunication terminal, wherein the user can select from security information comprising information concerning an interior and an exterior of the vehicle.

* * * * *